Oct. 19, 1937.                J. W. RICHARDSON                 2,096,408
                        AUTOMATIC RELIEF AND DRAIN VALVE
                        Filed March 27, 1936      2 Sheets-Sheet 1
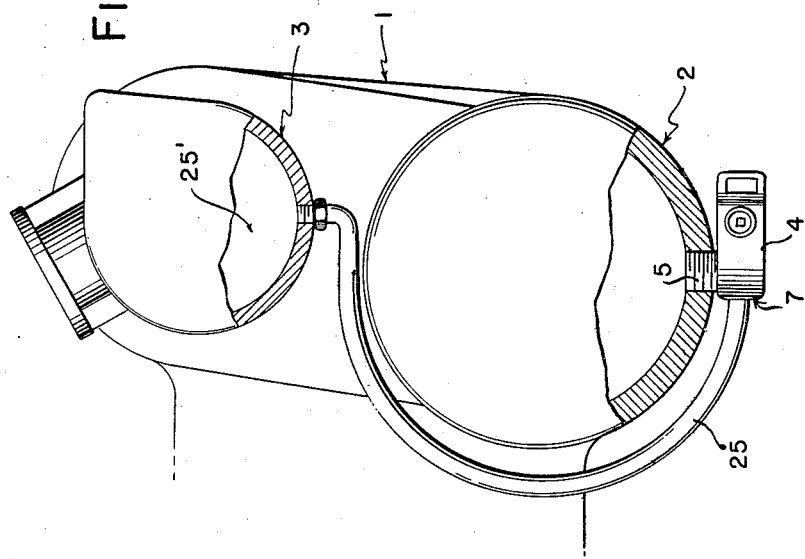
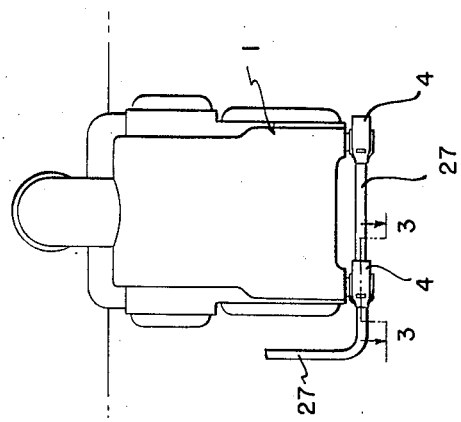
INVENTOR
J. W. RICHARDSON
BY
ATTORNEYS Oct. 19, 1937.   J. W. RICHARDSON   2,096,408
AUTOMATIC RELIEF AND DRAIN VALVE
Filed March 27, 1936   2 Sheets-Sheet 2
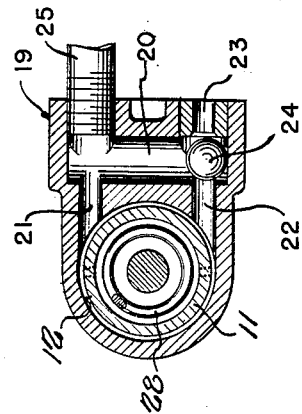
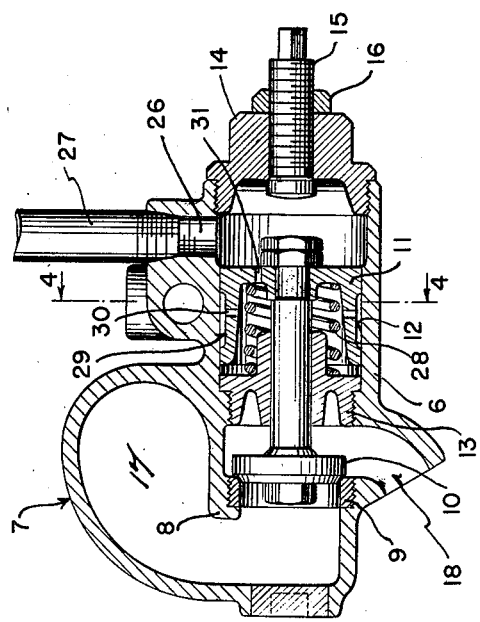
INVENTOR
J. W. RICHARDSON
BY
ATTORNEYS Patented Oct. 19, 1937

2,096,408

UNITED STATES PATENT OFFICE 2,096,408

AUTOMATIC RELIEF AND DRAIN VALVE

John W. Richardson, Milwaukee, Wis., assignor to The Prime Manufacturing Company, Milwaukee, Wis.

Application March 27, 1936, Serial No. 71,165

9 Claims. (Cl. 121—134)

This invention pertains to automatic relief valves, such as disclosed in United States Letters Patent No. 1,343,550, issued to Thomas W. Demarest, on June 15, 1920.

Valves of the foregoing type are designed primarily for use upon steam cylinders, and more particularly locomotive cylinders, to relieve condensation and excessive pressure within the cylinder.

Heretofore, in valves of the type in question, it has been customary to provide a restricted opening, or continuous bleed, forming a communication past the valve, with the result that when the valve is closed, sufficient steam pressure is permitted to enter the cylinder to actuate the piston and cause creeping of the locomotive.

It is therefore the primary object of the present invention to provide a relief valve for steam cylinders, in which there is no communication between the fluid-actuating pressure and the cylinder.

Incidental to the foregoing, a more specific object of the present invention resides in the provision of a piston-actuated relief valve, in which the valve controls communication between the cylinder and outside atmosphere, while the actuating pressure fluid has no access to said communication.

A further object is to bleed the actuating pressure fluid to atmosphere through the exhaust chamber of the cylinder valve, which also provides for drainage, and causes constant agitation through the line to prevent accumulation of obstructing foreign matter.

Another object is to provide a valve, which in addition to accomplishing the foregoing results, serves to drain condensation from the cylinder, the exhaust chamber of the cylinder valve, the pressure actuating line, and from the valve itself.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings are illustrated one complete example of the physical embodiment of the present invention constructed according to the best mode so far devised for the practical application of the principles thereof.

In the drawings:

Figure 1 is an elevation of a conventional steam chest, with the present invention applied thereto.

Figure 2 is an enlarged end view of the same, with parts broken away and in section.

Figure 3 is an enlarged horizontal section through one of the valves, indicated by the line 3—3 of Figure 1, and Figure 4 is a transverse section taken on the line 4—4 of Figure 3.

Referring now more particularly to the accompanying drawings, the numeral 1 designates generally the steam chest of a locomotive, including a cylinder 2 and a valve casing 3. As best shown in Figure 1, the valves 4 comprising the present invention are secured to the ends of the cylinder 2 by nipples 5 threaded into the lowermost point of the cylinder and the tops of the valves, for the purpose of relieving excess pressure created within the cylinder, and allowing drainage of condensation when the steam supply is cut off.

The valves 4 are identical, and therefore the description and explanation of their structure and operation will be confined to a single valve for the purpose of simplicity.

As best shown in Figure 3, each valve 4 comprises a housing 6, provided with an offset boss 7 for reception of the threaded nipple 5, which connects the valve with the cylinder 2. Threaded into a partition 8 formed in the valve casing is a valve seat 9 controlled by the valve 10, the shank of which is secured to a piston 11 slidably mounted within the bore 12, which is closed at one end by a plug 13, while the opposite end is closed by a threaded cap 14, which carries a threaded stud 15, capable of being locked in adjusted position by the nut 16.

Obviously, the opening through the partition 8, which forms a communication between the compartment 17 and the exhaust passage 18 to outside atmosphere, is segregated from the bore 12, in which the pressure actuating fluid is confined, as will be hereinafter described in detail, there being no communication between the bore and the compartment 17, whereby the actuating pressure fluid may enter the latter.

Transversely alined with the bore 12 the housing 6 is provided at one side with a vertical offset boss 19, having a vertical duct 20, and upper and lower ports 21 and 22, respectively, communicating with the bore. Alined with the lower port 22 is a thimble provided with an outlet port 23, which, under certain conditions to be hereinafter described, is closed by a ball check 24, confined within the vertical duct 20.

Threaded into the upper end of the boss 19, and communicating with the duct 20, is a line 25, which is preferably connected into the bottom of the exhaust chamber 25' of the valve casing 3, as best shown in Figure 2.

In addition to the foregoing, the housing 6 is provided with an inlet 26, that is connected with a source of pressure fluid supply through the line 27, the supply being manually controlled by the operator for actuating the valve 10 when desired, as will be hereinafter explained in connection with the operation of the invention.

The piston 11, secured to the shank of the valve 10, is normally urged in one direction by a coil spring 28 disposed between the plug 13 and the piston to open the valve, as best shown in Figure 3, and it will be noted that the piston 11 is provided with an annularly reduced portion 29, and a plurality of radial openings 30 forming communications between the groove 29 and interior of the piston. Also, the head of the piston is provided with an orifice 31 serving as a communication therethrough.

Considering now the operation of the present invention under various conditions, when the engine or locomotive is working, the operator manually admits the actuating fluid pressure through the line 27 to the bore 12, which acting upon the piston 11 closes the valve 10, thus cutting off communication between the cylinder and exhaust or outside atmosphere. In the event that excess pressure is developed within the cylinder, and the compartment 17 communicating therewith, the same exerts itself upon the valve 10 to overcome the actuating fluid pressure, thus opening the valve and allowing the excess pressure to exhaust to atmosphere through the passage 18. When the excessive pressure within the cylinder has been relieved, the valve is immediately closed by the actuating fluid pressure exerted upon the top of the piston 11, the operation being automatic.

When the engine is not in operation, and it is desired to open the valve 10, the operator merely cuts off the supply of actuating pressure fluid, which permits the spring 28 to open the valve 10, thus allowing draining of condensation from the cylinder.

When the engine is drifting, the valve 10 is also closed, thus preventing cold air from being sucked into the cylinders, which causes flashing that affects the lubrication within the cylinder, and results in excessive accumulation of carbon detrimental to the engine.

It is to be noted that any bleed of pressure actuating fluid through the piston 11 will travel through passages 21 and 22, and consequently through the line 25, which communicates with the exhaust compartment 25' of the valve casing 3. Due to the pressure of the actuating fluid, the ball check 24 closes the outlet 23, thus causing substantially all of the pressure fluid to pass through the line 25, which creates a constant agitation in the line to prevent accumulation and coagulation of sediment and foreign matter, which might obstruct subsequent drainage from the exhaust compartment 25'.

Obviously, when the pressure actuating fluid is cut off, any condensation within the casing 3 will drain back through the line 25 into the duct 20, and be discharged through the opening 23.

The duct 22, being positioned at the lowermost portion of the bore 12, will necessarily drain all condensation that may accumulate within the same. Thus it will be seen that in addition to draining the cylinder through the compartment 17 and the exhaust passage 18, the valve casing exhaust chamber 25' and the valve itself are effectually drained.

Furthermore, when the valve 10 is unseated, the annular groove 29, formed in the piston 11, partially registers with the port 26, thus permitting a continuous drainage of the line 27.

Lastly, when it is desired to eliminate automatic operation of the valve 10, for any desired purpose, the same is accomplished by turning down the stud 15, which locks the valve on its seat 9.

From the foregoing explanation, considered in connection with the accompanying drawings, it will be seen that an exceedingly compact and efficient relief and drain valve has been provided, which allows maximum road clearance, and functions to effectively relieve excessive pressure within the cylinder, as well as draining the condensation from the cylinder, the valve itself, and the actuating pressure fluid line.

Another important feature to be emphasized is the bleed connection 25 to the exhaust compartment of the steam chest, inasmuch as this not only accomplishes draining of condensation from the compartment, which is highly desirable, but creates a constant agitation in the steam channels of the steam chest, and thus prevents accumulation and coagulation of sediment and foreign matter therein. This bleed also effectively prevents the seeping of steam into the cylinder, which prevents creeping of the locomotive.

Having thus described the invention in considerable detail, it is to be understood that the salient feature resides in eliminating any possible communication between the actuating pressure fluid and the cylinder, which is highly important when an engine has steam up, as in roundhouses, and it is desired to keep the valves 10 closed, the present invention preventing the possibility of building up sufficient pressure within the cylinder to cause creeping of the engine, which frequently occurs in relief valves of conventional structure.

I claim:—

1. A relief valve for steam cylinders comprising, a valve housing including a cylinder and independent communicating inlet and exhaust ports, a communication between the inlet port and steam cylinder, a valve for controlling the communication between the inlet and exhaust ports, a fluid pressure operated piston within said cylinder for closing said valve, and a communication between said cylinder and the exhaust chamber of the steam cylinder valve, said cylinder having a drainage outlet.

2. A relief valve for steam cylinders comprising a valve housing having communicating inlet and outlet ports and a cylinder segregated from the inlet port, a valve for controlling the communication between the inlet and exhaust ports, a piston within said cylinder for actuating said valve, and a communication between said cylinder and the exhaust chamber of the steam cylinder, said piston cylinder being provided with a drain outlet.

3. A relief valve for steam cylinders comprising, a housing having communicating inlet and exhaust chambers and a piston cylinder, a communication between the inlet chamber and steam cylinder, a partition between said piston cylinder and exhaust chamber, a valve for controlling communication between the inlet and exhaust chambers, a piston in said cylinder for actuating said valve, said piston cylinder having a pressure fluid inlet port and an outlet port, and a connection between the outlet port and the exhaust chamber of the steam cylinder, said piston being disposed between the pressure fluid inlet and outlet ports and having a bleed to provide restricted communication between the inlet and outlet ports.

4. A relief valve for steam cylinders comprising, a housing having communicating inlet and exhaust chambers and a piston cylinder, a communication between the inlet chamber and steam cylinder, a partition between said piston cylinder and exhaust chamber, a valve for controlling communication between the inlet and exhaust chambers, a piston in said cylinder for actuating said valve, said piston cylinder having a fluid inlet and independent drain and outlet ports, a connection between the outlet port and the exhaust chamber of the steam cylinder, said piston being disposed between the pressure fluid inlet and the outlet and drain ports and having a bleed to provide a restricted communication between the inlet and outlet ports, and a spring for opening said valve.

5. A relief valve for steam cylinders comprising, a housing having communicating inlet and exhaust chambers and a piston cylinder, a communication between the inlet chamber and steam cylinder, a partition between said piston cylinder and exhaust chamber, a valve for controlling communication between the inlet and exhaust chambers, a piston in said cylinder for actuating said valve, said piston cylinder having a pressure fluid inlet and independent communicating drain and outlet ports, a check valve for controlling said drain port, and a communication between the outlet port and the exhaust chamber of the steam cylinder, said piston being disposed between the pressure fluid inlet and the outlet and drain ports and having a bleed to provide restricted communication between the inlet and outlet ports.

6. A relief valve for steam cylinders comprising a housing for communicating inlet and exhaust chambers and a piston cylinder, a communication between the inlet chamber and steam cylinder, a partition between said piston cylinder and exhaust chamber, a valve for controlling communication between the inlet and exhaust chambers, a piston in said cylinder for actuating said valve, said piston cylinder having a pressure fluid inlet and independent drain and outlet ports, the drain port communicating with the lowermost portion of said piston cylinder, a check valve controlling said drain port, and a connection between the outlet port and the exhaust chamber of the steam cylinder, said piston being disposed between the pressure fluid inlet and outlet and drain ports and having a bleed to provide a restricted communication between the inlet and outlet ports.

7. A relief valve for steam cylinders comprising a housing having communicating inlet and exhaust chambers and a piston cylinder, a communication between the inlet chamber and steam cylinder, a partition between said piston cylinder and exhaust chamber, a valve for controlling communication between the inlet and exhaust chambers, a piston in said cylinder for actuating said valve, said piston cylinder having a pressure fluid inlet and independent drain and outlet ports, a connection between the outlet port and the exhaust chamber of the steam cylinder, said piston being disposed between the pressure fluid inlet and the outlet and drain ports and having a bleed to provide restricted communication between the inlet and outlet ports, and means for manually closing said valve.

8. A relief valve for steam cylinders comprising, a housing having communicating inlet and exhaust chambers and a piston cylinder, a communication between the inlet chamber and steam cylinder, a partition between said piston cylinder and exhaust chamber, a valve for controlling communication between the inlet and exhaust chambers and having a valve stem slidable in said partition, a piston in said cylinder carried by the valve stem for actuating said valve, a spring disposed between said partition and piston for urging the valve to open position, said piston cylinder having a pressure fluid inlet and independent drain and outlet ports, and a connection between the outlet port and the exhaust chamber of the steam cylinder, said piston being disposed between the pressure fluid inlet and the outlet and drain ports and having a bleed to provide a restricted communication between the inlet and outlet ports.

9. A relief valve for steam cylinders comprising a housing having communicating inlet and exhaust chambers and a piston cylinder, a communication between the inlet chamber and steam cylinder, a partition between said piston cylinder and exhaust chamber, a valve for controlling communication between the inlet and exhaust chambers and having a valve stem slidably journaled in said partition, a piston secured to the valve stem within said cylinder, said piston cylinder having a fluid pressure inlet and independent communicating drain and outlet ports, the drain port communicating with the lowermost portion of said cylinder, a spring disposed between the partition and piston for normally opening said valve, a connection between the outlet port and the exhaust chamber of the steam cylinder, said piston being disposed between the pressure fluid inlet and outlet and drain ports and having a bleed to provide restricted communication between the inlet and outlet ports, a check valve for controlling said drain port, and means for manually closing the first mentioned valve.

JOHN W. RICHARDSON.